(12) United States Patent
Okubo et al.

(10) Patent No.: US 7,295,776 B2
(45) Date of Patent: Nov. 13, 2007

(54) OPTICAL LAN DEVICE

(75) Inventors: Youichi Okubo, Gifu-ken (JP);
Michiya Katou, Ichinomiya (JP);
Shinichi Kawase, Ichinomiya (JP)

(73) Assignee: Pacific Industrial Co., Ltd. (JP)

( * ) Notice: Subject to any disclaimer, the term of this patent is extended or adjusted under 35 U.S.C. 154(b) by 561 days.

(21) Appl. No.: 10/934,859

(22) Filed: Sep. 3, 2004

(65) Prior Publication Data
US 2005/0286892 A1    Dec. 29, 2005

(30) Foreign Application Priority Data
Jun. 29, 2004    (JP)    ............................. 2004-191770

(51) Int. Cl.
*H04B 10/20*    (2006.01)
(52) U.S. Cl. ............................. 398/58; 398/59; 398/66; 398/67; 398/68; 398/69; 398/70; 398/71; 398/72; 398/3; 398/9; 398/10; 398/16; 398/17; 398/177; 398/181; 398/33; 398/30; 398/31; 398/22; 398/23; 398/24; 398/79
(58) Field of Classification Search .................. 398/19, 398/11, 17, 18, 20, 177, 181, 154, 30, 135, 398/33, 59, 24, 70, 23, 71, 22, 72, 83, 16, 398/79, 10, 15, 58, 66, 67, 68, 69, 3, 2, 31, 398/100
See application file for complete search history.

(56) References Cited
U.S. PATENT DOCUMENTS
5,317,198 A * 5/1994 Husbands .................... 307/116
6,199,174 B1    3/2001 Norizuki et al.
6,452,701 B1 * 9/2002 Terahara et al. ............... 398/30
6,807,370 B2 * 10/2004 Harasawa ..................... 398/13

FOREIGN PATENT DOCUMENTS
JP    57092934    6/1982
JP    11-313098    11/1999

* cited by examiner

*Primary Examiner*—Hanh Phan
(74) *Attorney, Agent, or Firm*—Marsh Fischmann & Breyfogle LLP

(57) ABSTRACT

An ring type optical LAN device includes a master node and a plurality of slave nodes that are interconnected by an optical fiber cable. A plurality of optical bypass transmission lines are provided in correspondence with each one of the slave nodes. Each of the optical bypass transmission lines bypasses the corresponding one of the slave nodes. Each slave node includes an E/O converter and an optical cutoff circuit. Each of the E/O converters is controlled to flash for generating an optical signal, which is transmitted to a network. When any one of the slave nodes fails such that the corresponding E/O converter is maintained in a turned on state, the associated optical cutoff circuit forcibly switches the E/O converter to a turned off state. This suppresses a network crash caused by the failure maintaining the E/O converter in the turned on state.

8 Claims, 4 Drawing Sheets

OPTICAL LAN DEVICE

BACKGROUND OF THE INVENTION

The present invention relates to optical LAN devices including a master node and a plurality of slave nodes that are interconnected by an optical fiber cable for configuring a network, and, more particularly, to techniques for suppressing a network crash due to failure caused in the slave nodes.

Typically, a ring type optical LAN device includes a master node and a plurality of slave nodes that are interconnected by an optical-fiber cable for configuring a network. In this device, an optical signal is sent from the master node to the network, circulated through the slave nodes, and returned to the master node. However, if any one of the slave nodes fails, the optical signal cannot be passed to the slave node subsequent to the failed slave node, leading to a network crash.

To solve this problem, Japanese Laid-Open Patent Publication No. 11-313098 describes a technique for preventing a network crash even if part of the slave nodes fails. More specifically, in accordance with the technique, each of the slave nodes is provided with an optical bypass transmission line. An optical branching device is connected to the upstream end of each of the optical bypass transmission lines. An optical coupling device is connected to the downstream end of each optical bypass transmission line. Each of the optical branching devices branches an optical signal transmitted through the network to an optical signal directed to the corresponding optical bypass transmission line and an optical signal directed to the corresponding slave node. Each of the optical coupling devices couples the optical signal from the corresponding optical bypass transmission line with the optical signal from the corresponding slave node, generating a single optical signal.

If any one of the slave nodes fails, the master node isolates the failed slave node from the network in terms of the protocol. Further, when the master node sends an optical signal to the network, the optical signal is transmitted to the slave node subsequent to the failed slave node through the optical bypass transmission line corresponding to the failed slave node. This prevents a network crash from being caused by the failed slave node.

Each of the slave nodes has a light sending portion. The light sending portions are controlled to flash for generating an optical signal transmitted to the network. In the aforementioned publication, if any one of the slave nodes fails and the corresponding light sending portion is maintained as turned off, the failed slave node maintains the optical signal in a turned off state. In other words, the failed slave node cannot transmit the optical signal to the network. In this case, when the corresponding optical coupling device receives a normal optical signal from the associated optical bypass transmission line, the optical coupling device simply sends the signal to the slave node subsequent to the failed slave node. This allows the slave nodes subsequent to the failed slave node and the master node to read required information from the optical signal, which is transmitted through the network, without being affected by the failed slave node.

In contrast, if any one of the slave nodes fails and the corresponding light sending portion is maintained as turned on, the failed slave node continuously transmits an optical signal maintained in a turned on state. In this case, the corresponding optical coupling device superimposes the optical signal from the failed slave node on a normal signal received from the associated optical bypass transmission line. That is, the optical coupling device continuously transmits the signal held in the turned on state to the slave node subsequent to the failed slave node. This prevents the slave nodes subsequent to the failed slave node and the master node from reading required information from the signal transmitted through the network, resulting in a network crash.

SUMMARY OF THE INVENTION

Accordingly, it is an objective of the present invention to provide an optical LAN device capable of suppressing a network crash caused by a failure of a slave node maintaining a corresponding light sending portion in a turned on state.

To achieve the above-mentioned objective, the present invention provides an optical LAN device including a master node and a plurality of slave nodes interconnected by an optical fiber cable for configuring a network. The network includes a plurality of optical bypass transmission lines each corresponding to an associated one of the slave nodes. Each of the optical bypass transmission lines bypasses the corresponding slave node. Each of the slave nodes includes a light sending portion controlled to flash for generating an optical signal transmitted to the network. Each of the slave nodes further includes an optical cutoff circuit for forcibly switching the light sending portion to a turned off state when the slave node fails such that the corresponding light sending portion is maintained in a turned on state.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will now be described with reference to the attached drawings.

Figure 1:
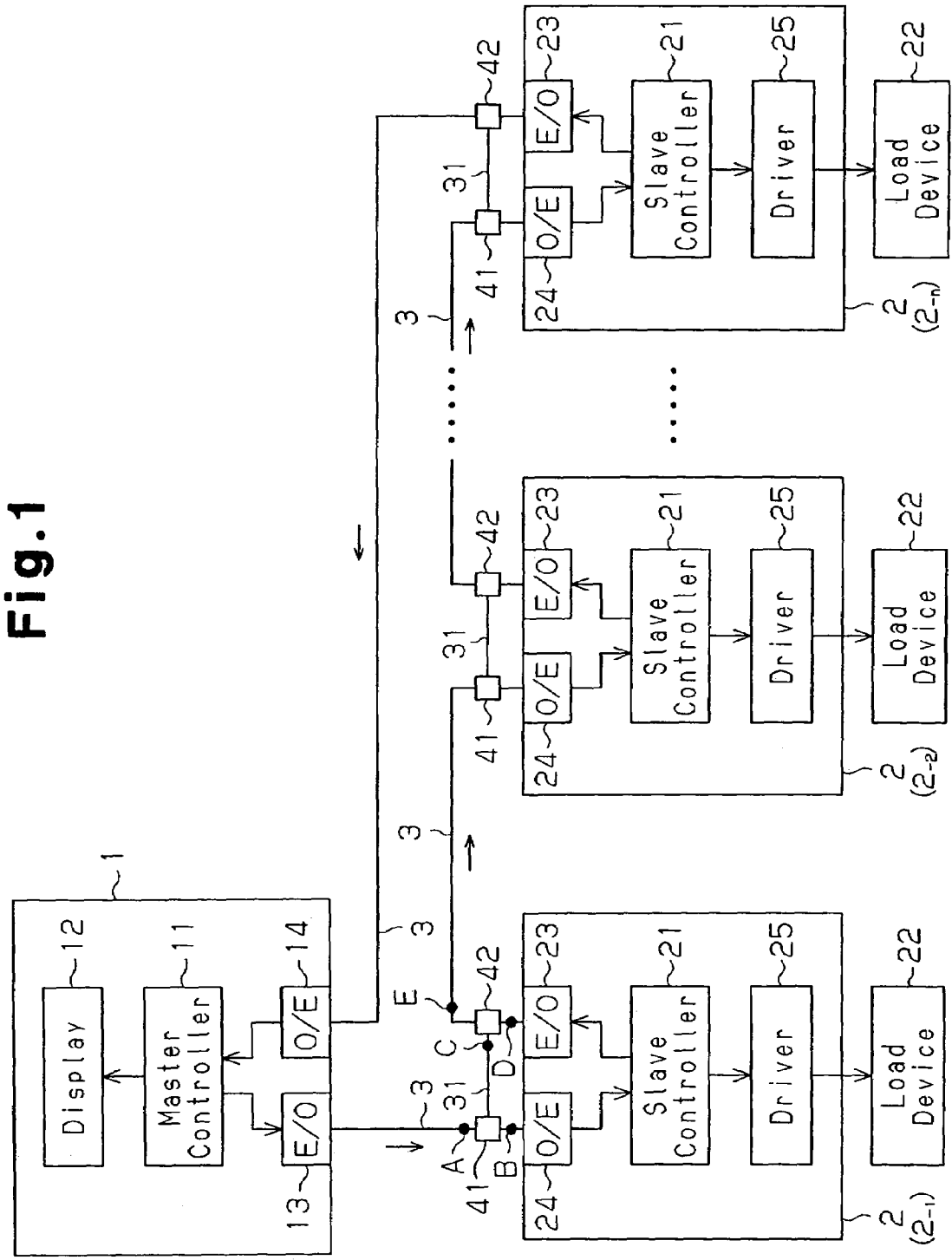
FIG. 1 is a schematic view showing the configuration of an optical LAN device according to an embodiment of the present invention.

As illustrated in FIG. 1, an optical LAN device according to the present invention is a ring type, which is preferably applied to vehicles. The ring type optical LAN device includes a master node 1 and a plurality of slave nodes 2, or first to n-th slave nodes 2-1 to 2-n. The master node 1 and each of the slave nodes 2 are interconnected by an optical fiber cable 3, such that a ring type network is established.

The master node 1 is installed in, for example, an instrument panel of a vehicle (not illustrated). The master node 1 includes a controller (a master controller) 11, which is formed by a microcomputer or the like. The master controller 11 includes, for example, a central processing unit (CPU), a read only memory (ROM), and a random access memory (RAM). A display 12 serving as an annunciator is connected to the master controller 11. The display 12 is exposed on the instrument panel, such that the display 12 is visible to the vehicle operator. The master controller 11 controls the display 12 to indicate the current state of each of the slave nodes 2 by means of characters or codes, when necessary. The display 12 may be replaced by a plurality of indicator lamps provided in the number corresponding to the slave nodes 2. If this is the case, the master controller 11 operates to inform the vehicle operator of the state of any one of the slave nodes 2 by turning on or flashing the corresponding indicator lamp.

An E/O converter (an electrical-optical converter) 13, which serves as a light sending portion, is connected to the master controller 11 by a cable. An O/E converter (an optical-electrical converter) 14 serving as a light input portion is connected to the master controller 11 by a cable. The E/O converter 13 receives an electrical signal from the master controller 11 through the cable and converts the signal to an optical signal. The optical signal is then transmitted to the optical fiber cable 3, which is connected to the E/O converter 13. The O/E converter 14 receives the optical signal from the optical fiber cable 3, which is connected to the O/E converter 14, and converts the optical signal to an electrical signal. The electrical signal is then sent to the master controller 11 through the corresponding cable.

The slave nodes 2 are installed in various portions of the vehicle. Each of the slave nodes 2 is connected to a load device 22, which is an on-vehicle electrical equipment. The load devices 22 are formed by different types of electrical actuators including motors and lamps. In response to an instruction from the master node 1, each slave node 2 actuates the corresponding load device 22. A specific address is given to each of the slave nodes 2.

Each slave node 2 has a controller (a slave controller) 21, which is formed by a microcomputer or the like. Each of the slave controllers 21 includes, for example, a central processing unit (CPU), a read only memory (ROM), and a random access memory (RAM). An E/O converter (an electrical-optical converter) 23, which serves as a light sending portion, is connected to each slave controller 21 by a cable. An O/E converter (an optical-electrical converter) 24 serving as a light input portion is connected to each slave controller 21 by a cable. Each of the E/O converters 23 receives an electrical signal from the corresponding slave controller 21 through the cable and converts the signal to an optical signal. The optical signal is then transmitted to the optical fiber cable 3, which is connected to the E/O converter 23. Each of the O/E converters 24 receives the optical signal from the optical fiber cable 3, which is connected to the O/E converter 24, and converts the optical signal to an electrical signal. The electrical signal is then sent to the corresponding slave controller 21 through the corresponding cable.

Each of the load devices 22 is connected to the corresponding one of the slave controllers 21 by means of a driver 25. The slave controllers 21 actuate the corresponding load devices 22 by controlling the associated drivers 25.

An optical bypass transmission line, which is configured by an optical fiber cable 31, is provided in correspondence with each of the slave nodes 2. That is, the optical fiber cable 31, or an optical bypass transmission line 31, is located between the O/E converter 24 and the E/O converter 23 of the corresponding slave node 2. Each of the optical bypass transmission lines 31 is connected to an optical transmission line, which is configured by the optical fiber cable 3, through an optical branching device 41 and an optical coupling device 42.

Each of the optical branching devices 41 has a single light input portion and a pair of light output portions. Each optical branching device 41 branches a single optical signal, which is received from an upstream section of the light transmission line through the corresponding light input portion, to a pair of optical signals. One of the two optical signals is transmitted to the corresponding optical bypass transmission line 31 through the corresponding one of the light output portions. The other is sent to the corresponding slave node 2 through the other light output portion. Each of the optical coupling devices 42 includes a pair of light input portions and a single light output portion. Each optical coupling device 42 receives an optical signal from the corresponding optical bypass transmission line 31 through one of the light input portions and another optical signal from the corresponding slave node 2 through the other light input portion. The optical coupling device 42 then couples the optical signals together to form a single optical signal. The optical signal is transmitted to a downstream section of the optical transmission line through the light output portion.

In the illustrated optical LAN device, the token passing method is employed as the access control method. More specifically, the master node 1 sends a token signal to the network, or the optical transmission line configured by the optical fiber cables 3, 31, as an instructing signal. The instructing signal includes address information of the slave node 2 to which the signal is addressed, as well as various types of instructing information. The instructing signal sent by the master node 1 is first received by the first slave node 2-1. If the address included in the instructing signal matches that of the first slave node 2-1, the first slave node 2-1 executes an operation according to instructing information of the instructing signal. Further, the first slave node 2-1 adds required return information to the instructing signal. The resulting signal is transmitted to the network as a return signal for the master node 1. However, if the address included in the instructing signal does not match that of the first slave node 2-1, the first slave node 2-1 simply transmits the instructing signal to the network.

The token signal (the return or instructing signal) transmitted from the first slave node 2-1 to the network is received by the second slave node 2-2. The second slave node 2-2 executes an operation in accordance with the received token signal, like the first slave node 2-1. The token signal is then passed to the subsequent slave node 2. In this manner, the token signal transmitted by the master node 1 as the instructing signal is passed successively from the first slave node 2-1 to the n-th slave node 2-n. The final slave node 2-n transmits the token signal to the network, such that the master node 1 receives the token signal as the return signal. The master node 1 acquires the state of the slave node 2 corresponding to the return signal, in accordance with return information included in the return signal.

Figure 3A:
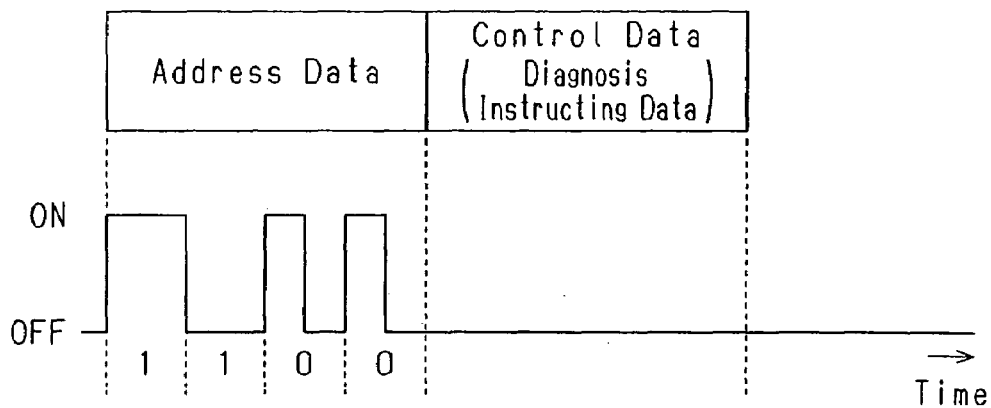
FIGS. 3(a) to 3(c) are views each explaining a token signal circulated through the network.
Figure 3B:
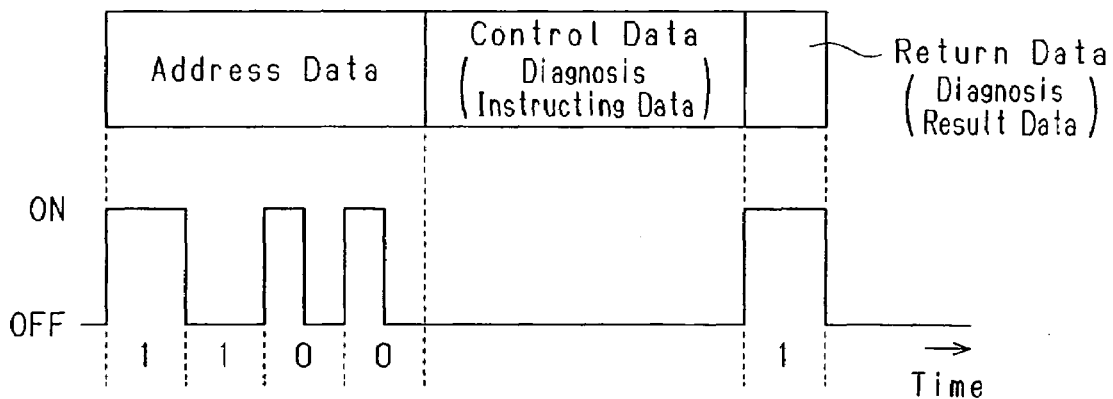
Figure 3C:
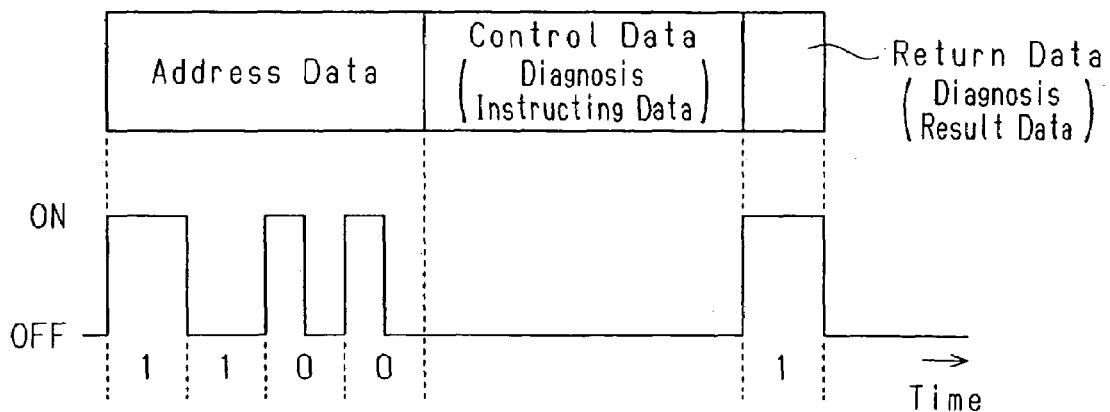

FIGS. 3(a) to 3(c) each illustrate the token signal circulated through the network including the master node 1 and the slave nodes 2. The token signal includes address data, control data, and return data. The address data is information indicating the address of the slave node 2 to which the token signal is addressed. The control data is information indicating instructions to the addressed slave node 2, including instructing data related to failure-diagnosis of the slave node 2 (diagnosis instructing data) and instructing data related to the operation of the corresponding load device 22 (operation instructing data). Each of the slave nodes 2 performs a failure-diagnosis procedure for the slave node 2 and controls the corresponding load device 22, in accordance with the instructions indicated by the control data.

The return data represents the return information, which is added to the instructing signal received by the slave node 2 from the master node 1. The return data includes data indicating a result of failure-diagnosis of the slave node 2 (diagnosis result data), as well as data indicating the operational state of the corresponding load device 22.

The master node 1 transmits the token signal including the address data and control data to the network as the instructing signal (see FIG. 3(a)). If the address included in the instruction signal matches the address of any one of the slave nodes 2, the slave node 2 adds the return information to the instructing signal. The instruction signal is then transmitted to the network as the return signal directed to the master node 1 (see FIG. 3(b)).

The address data, the control data, and the return data are configured by binary code signals having a plurality of bits. In this case, each of the data is indicated by a bit digit string configured by an ON state and an OFF state of the optical signal generated by the E/O converters 13, 23 in the optical fiber cable 3. In the illustrated embodiment, with reference to FIGS. 3(a) to 3(c), the bit code "0" is configured by a single cycle of a symmetrical square wave signal, or a combination of an ON signal and an OFF signal. The bit code "1" is configured by the ON signal or OFF signal maintained for the period corresponding to one cycle of the aforementioned symmetrical square wave signal. Regardless of in what pattern the bit codes "0" and "1" are continued, the optical signal is a pulse-like signal at the duty ratio of 50%, in which the ON state and OFF state are alternated at relatively short time intervals.

FIGS. 3(a) to 3(c) each show an example in which the control data corresponds to diagnosis instructing data and the return data corresponds to diagnosis result data. In this example, the address data is indicated as four bit data. In other words, the address data is capable of indicating a maximum of sixteen addresses. The bit count of the address data may be changed as necessary.

The diagnosis instructing data is configured by an OFF signal lasting for a predetermined period. In the illustrated embodiment, when receiving an optical signal maintained in the turned off state for the predetermined period after the four bit, address data, each of the slave nodes 2 determines that the slave node 2 has received a failure diagnosis instruction from the master node 1.

The diagnosis result data (diagnosis result information) is configured by an ON signal representing the bit code "1". In the illustrated embodiment, when each slave node 2 determines the slave node 2 is operating normally, the slave node 2 adds the ON signal representing the bit code "1" to the instructing signal as the diagnosis result data (see FIG. 3(b)).

FIG. 3(a) illustrates the optical signal corresponding to the points A, B, C on the optical transmission line of FIG. 1. After passing through the point A, the optical signal is branched to two branch signals by the optical branching device 41. One of the branch signals reaches the point B on the optical transmission line connected to the first slave node 2-1, and the other reaches the point C on the optical bypass transmission line 31. The signals corresponding to the points A, B, C are identical with one another. That is, each of the signals is an instructing signal for failure diagnosis (a diagnosis instructing signal) transmitted by the master node 1. The optical signal includes the address data and the control data (the diagnosis instructing data) but does not include the return data (the diagnosis result data).

FIG. 3(b) illustrates an optical signal corresponding to the point D on the optical transmission line of FIG. 1. More specifically, when the first slave node 2-1 receives the diagnosis instructing signal that has passed through the point B and the address included in the diagnosis instructing signal matches the address of the slave node 2-1, the slave node 2-1 transmits a return signal configured by adding the return data (the diagnosis result data) to the diagnosis instructing signal. Thus, the optical signal corresponding to the point D is the return signal transmitted by the first slave node 2-1.

FIG. 3(c) illustrates an optical signal corresponding to the point E on the optical transmission line of FIG. 1. After the two branch signals pass through the corresponding one of the points C, D, the optical coupling device 42 couples the signals together. The resulting optical signal is then transmitted to the point E connected to the subsequent, second slave node 2-2 on the optical transmission line. The optical signal corresponding to the point E is the optical signal of FIG. 3(a) superimposed on that of FIG. 3(b) and is substantially identical with the optical signal of FIG. 3(b).

In contrast, if the first slave node 2-1 receives the diagnosis instructing signal that has passed through the point B and the address included in the signal does not match the address of the first slave node 2-1, the first slave node 2-1 simply transmits the received signal. The optical signal corresponding to the point D is thus identical with the optical signal of FIG. 3(a). Further, the optical signal corresponding to the point E is also identical with the optical signal of FIG. 3(a).

The E/O converter 23 of each of the slave nodes 2 is controlled to flash, such that an optical signal to be transmitted to the optical transmission line is generated. If the first slave node 2-1 fails and the E/O converter 23 of the first slave node 2-1 is maintained in a turned off state, no optical signal reaches the point D. In this case, the optical coupling device 42 simply transmits the optical signal received from the optical bypass transmission line 31 to the point E. The optical signal corresponding to the point E is thus identical with the optical signal of FIG. 3(a).

However, if the first slave node 2-1 fails such that the corresponding E/O converter 23 is maintained in a turned on state, the E/O converter 23 continues transmitting the optical signal maintained in the ON state. The optical signal corresponding to the point D is thus maintained in the ON state. If the corresponding optical coupling device 42 superimposes the optical signal of the point D on the optical signal received from the optical bypass transmission line 31, the optical signal corresponding to the point E simply becomes an optical signal maintained in the ON state. This makes it impossible for the subsequent slave nodes 2 and the master node 1 to read required information from the optical signal on the optical transmission line, leading to a network crash.

To solve this problem, each of the slave nodes 2 of the illustrated embodiment includes an optical cutoff circuit 60. More specifically, if any one of the slave nodes 2 fails such that the corresponding E/O converter 23 is maintained in the turned on state, the optical cutoff circuit 60 forcibly switches the E/O converter 23 to a turned off state. In other words, if any slave node 2 fails such that the corresponding E/O converter 23 continuously transmits the optical signal maintained in the ON state, the optical cutoff circuit 60 of the slave node 2 forcibly switches the optical signal to an OFF state. In the illustrated embodiment, each of the optical cutoff circuits 60 is configured by a hardware circuit integrated in the corresponding E/O converter 23.

Figure 2:
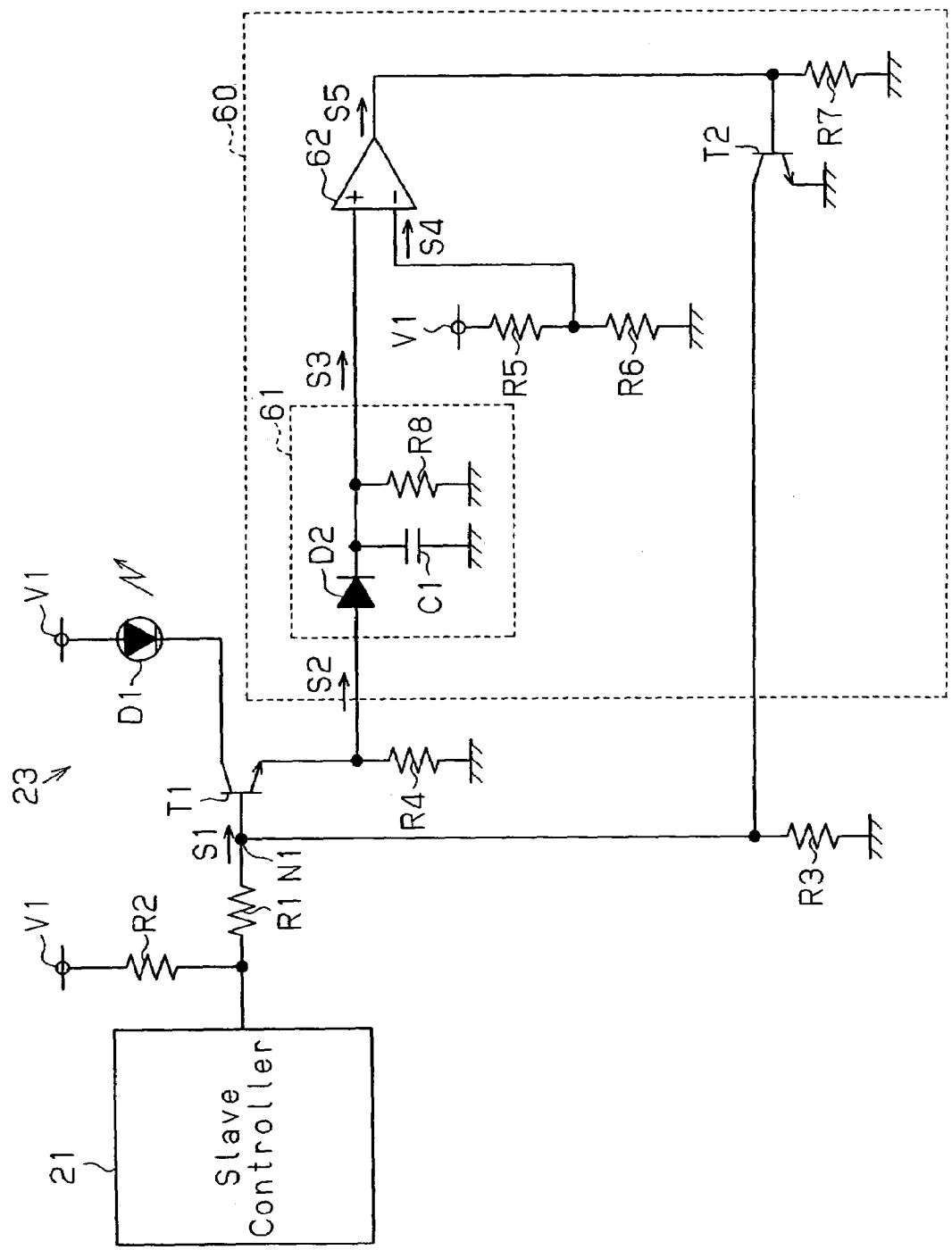
FIG. 2 is a block diagram showing the circuit configuration of an E/O converter of each of the slave nodes of FIG. 1.

FIG. 2 shows the circuit configuration of the E/O converter 23 of each slave node 2. With reference to FIG. 2, the slave controller 21 is connected to the base of a first transistor T1 through a resistor R1. In the illustrated embodiment, an NPN transistor is employed as the first transistor T1. A light emitting diode D1 serving as a light emitting element is connected to a collector of the first transistor T1. The light emitting diode D1 is also connected to a power supply V1. The power supply V1 is connected to a portion between the slave controller 21 and the resistor R1 through a resistor R2. A connecting point between the resistor R1 and the base of the first transistor T1, or a node N1, is grounded through a resistor R3. An emitter of the first transistor T1 is grounded through a resistor R4.

The first transistor T1 functions as a first switching element driving the light emitting diode D1. The first transistor T1 is controlled to be selectively turned on or off in accordance with a drive signal S1 from the slave controller 21, such that the light emitting diode D1 is selectively turned on or off. The drive signal S1 is a pulse-like voltage signal corresponding to an optical signal transmitted to the optical transmission line. The drive signal S1 is configured by alternating a high level signal and a low level signal. The first transistor T1 is turned on if the received drive signal S1 is at high level and is turned off if the received drive signal S1 is at low level. The light emitting diode D1 is turned on when the first transistor T1 is turned on and is turned off when the first transmitter T1 is turned off. The base of the first transistor T1 functions as an input terminal to which the slave controller 21 inputs the drive signal S1. Further, the node N1 may be considered as the input terminal of the first transistor T1.

In the illustrated embodiment, the voltage of the drive signal S1 at high level is 0.7 volts, and that of the drive signal S1 at low level is zero volts. When the first transistor T1 is held in the turned on state, the first transistor T1 outputs a voltage signal corresponding to the level of the drive signal S1 from an emitter. In the embodiment, the voltage of the power supply V1 is five volts. When the light emitting diode D1 is turned on, a voltage drop by two volts occurs in the light emitting diode D1. Therefore, if the level of the inputted drive signal S1 corresponds to the voltage of 0.7 volts, a voltage signal S2 at substantially three volts is outputted from the emitter of the first transistor T1. If the level of the inputted drive signal S1 corresponds to the voltage at zero volts, a voltage signal S2 at zero volts is outputted from the emitter of the first transistor T1.

Each of the optical cutoff circuits 60 includes a smoothing circuit 61, a comparing circuit 62, a second transistor T2, and resistors R5, R6, R7. The smoothing circuit 61 includes a light emitting diode D2, a capacitor C1, and a resistor R8 and smoothes the voltage signal S2. More specifically, if the voltage signal V2 is a square wave signal at three volts and at the duty ratio of 50%, the smoothing circuit 61 outputs a voltage signal S3 at substantially 1.5 volts. In other words, if the voltage signal S2 is a pulse-like signal alternated between the high level and the low level at relatively short time intervals, the smoothing circuit 61 outputs a voltage signal S3 at a level intermediate between the high level and the low level of the voltage signal S2. Further, if the voltage signal S2 is maintained at zero volts, the smoothing circuit 61 outputs the voltage signal S3 at zero volts. If the voltage signal S2 is maintained at three volts, the smoothing circuit 61 outputs the voltage signal S3 at three volts.

The comparing circuit 62 includes a non-reverse input terminal connected to the smoothing circuit 61. A reverse input terminal of the comparing circuit 62 receives a divided voltage obtained by dividing the voltage of the power supply V1 by means of the resistors R5, R6, as a reference signal S4.

An output terminal of the comparing circuit 62 is grounded through a resistor R7. The base of the second transistor T2 is connected to a portion between the output terminal of the comparing circuit 62 and the resistor R7. In the illustrated embodiment, an NPN transistor is used as the second transistor T2. The emitter of the second transistor T2 is grounded. The collector of the second transistor T2 is connected to the node N1.

The comparing circuit 62 compares the level of the voltage signal V3 outputted by the smoothing circuit 61 with a predetermined reference level, or the level of the reference signal S4. If the level of the voltage signal S3 is smaller than the level of the reference signal S4, the comparing circuit 62 outputs an output signal S5 at low level. In contrast, if the level of the voltage signal S3 is larger than the level of the reference signal S4, the comparing circuit 62 outputs an output signal S5 at high level. In this embodiment, the level of the reference signal S4 is set at 2.5 volts.

The second transistor T2 functions as a second switching element. The second transistor T2 is selectively turned on or off in accordance with the output signal S5 inputted by the comparing circuit 62. More specifically, the second transistor T2 is turned on if the output signal S5 is at high level and is turned off if the output signal S5 is at low level. In other words, the output signal S5 at high level is an ON signal for turning on the second transistor T2. If the second transistor T2 is turned on, the communication between the collector and emitter of the second transistor T2 is permitted. Further, the node N1, or the base, input terminal, of the first transistor T1 is grounded.

As long as the slave controller 21 functions normally, the slave controller 21 outputs a normal drive signal S1 to the first transistor T1. The normal drive signal S1 is a square wave signal at the duty ratio of 50% that is alternately switched between high level and low level at relatively short time intervals, without being maintained at high level longer than the period corresponding to the bit code "1" (see FIGS. 3(a) to 3(c)). When the normal drive signal S1 is inputted to the first transistor T1, the first transistor T1 is alternately turned on and off in correspondence with the drive signal S1, such that the light emitting diode D1 is correspondingly turned on and off in an alternating manner. In this state, the first transistor T1 outputs the voltage signal S2 at substantially three volts, which is a square wave signal at the duty ratio of 50%. The smoothing circuit 61 smoothes the voltage signal S2, thus outputting the voltage signal S3 at substantially 1.5 volts. The level of the voltage signal S3 is thus lower than the level of the reference signal S4, 2.5 volts. Therefore, the output signal S5 of the comparing circuit 62 is set at low level, such that the second transistor T2 is turned off.

As has been explained, as long as the slave controller 21 functions normally and the normal drive signal S1 is inputted to the first transistor T1, the second transistor T2 is held in the turned off state such that the corresponding optical cutoff circuit 60 does not operate.

If the drive signal S1 is no longer inputted to the first transistor T1 due to a failure of the slave controller 21, the first transistor T1 is no longer held in the turned on state. The light emitting diode D1 is thus maintained in an turned off state. If this is the case, the voltage signal S3 outputted by the smoothing circuit 61 is held at zero volts. The output signal S5 of the comparing circuit 62 is thus set at low level, turning off the second transistor T2. Accordingly, the corresponding optical cutoff circuit 60 does not operate.

In contrast, if the slave controller 21 fails such that the drive signal S1 at high level (0.7 volts) is continuously inputted to the first transistor T1, the first transistor T1 is held in the turned on state. The corresponding light emitting diode D1 is thus maintained in the turned on state. In this case, the voltage signal S2 outputted by the first transistor T1 is held at the level of approximately three volts. Therefore, the voltage signal S3 outputted by the smoothing circuit 61 is also held at the level of approximately three volts, which is larger than the level of the reference signal S4, 2.5 volts. The output signal S5 of the comparing circuit 62 is thus set at high level, turning on the second transistor T2. This permits the communication between the collector and emitter of the second transistor T2 and enables the base, or input terminal, of the first transistor T1 to be grounded through the second transistor T2. As a result, the voltage at the base of the first transistor T1 drops to substantially zero volts, which is the grounding voltage. The first transistor T1 is thus turned off, and the light emitting diode D1 is also turned off.

That is, if the slave node 2 fails such that the first transistor T1 is maintained in the turned on state, the optical cutoff circuit 60 forcibly switches the first transistor T1 from the turned on state to the turned off state. This places the light emitting diode D1 in the turned off state. In other words, if the slave controller 21 fails such that the drive signal S1 for holding the first transistor T1 in the turned on state is continuously outputted, the corresponding optical cutoff circuit 60 operates to invalidate the drive signal S1.

As has been described, if any one of the slave nodes 2 fails and the corresponding E/O converter 23 is held in the turned on state, no optical signal is transmitted by the E/O converter 23. Thus, when the optical coupling device 42 corresponding to the failed slave node 2 receives a normal optical signal from the optical bypass transmission line 31, the optical coupling device 42 simply sends the signal to a downstream section of the optical transmission line. Accordingly, the subsequent slave nodes 2 and the master node 1 are allowed to read required information from the optical signal transmitted by the optical transmission line, without being affected by the failed slave node 2.

Next, a failure diagnosis procedure executed by the master node 1 and the slave nodes 2 will be described.

Figure 4:
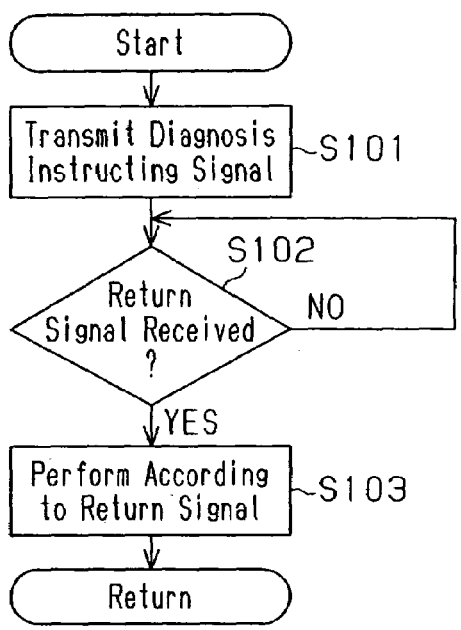
FIG. 4 is a flowchart explaining the operation of the master node.

First, the operation of the master node 1 according to the failure diagnosis procedure will be explained with reference to the flowchart of FIG. 4.

In step S101, the master controller 11 transmits an instructing signal for failure diagnosis to the slave nodes 2, or a diagnosis instructing signal, to the network through the E/O converter 13. The diagnosis instructing signal includes the address data representing the address of the slave node 2 to which the instructing signal is addressed, and the diagnosis instructing data (see FIG. 3(a)).

In step S102, the master controller 11 is held in a waiting state until the master controller 11 receives the return signal corresponding to the diagnosis instructing signal from the network through the O/E converter 14. When receiving the return signal, the master controller 11 executes a procedure as needed in accordance with the return signal in the subsequent step S103. The failure diagnosis procedure is then suspended.

More specifically, the master controller 11 determines whether or not the slave node 2 is failed in accordance with the diagnosis result data, which is included in the return signal. If the return signal includes the diagnosis result data, the master controller 11 determines that the slave node 2 functions normally and sends an instructing signal for actuating the corresponding load device 22 of the slave node 2. In contrast, if the return signal does not include the diagnosis result data, the master controller 11 determines that the slave node 2 is failed, and indicates the determination on the display 12.

The master node 1 may perform the aforementioned failure diagnosis procedure before sending the instructing signal for activating the load device 22 or at a predetermined timing (for example, when the power supply for the optical LAN device is turned on) or periodically. Further, the master controller 11 may transmit the diagnosis instructing signals for the first to n-th slave nodes 2-1 to 2-n as a signal sequence arranged in a predetermined order. Alternatively, the master controller 11 may transmit the diagnosis instructing signals separately for each of the slave nodes 2.

Hereafter, the operation of each of the slave nodes 2 according to the failure diagnosis procedure in a normally functioning state will be explained with reference to the flowchart of FIG. 5.

In step S201, the slave controller 21 of each slave node 2 is held in a waiting state until the slave controller 21 receives an instructing signal from the network through the corresponding O/E converter 24. If the slave controller 21 receives the instructing signal, the procedure proceeds to step S202. That is, the slave controller 21 determines whether or not the address indicated by the address data of the instructing signal matches the address of the slave controller 21. If the determination is negative, the slave controller 21 simply transmits the instructing signal to the network through the corresponding E/O converter 23, without adding the return data to the instructing signal. The procedure is then suspended. In contrast, if the determination of step S202 is positive, the procedure executed by the slave controller 21 proceeds to step S204.

In step S204, the slave controller 21 determines whether or not the instruction indicated by the control data, which is included in the instructing signal, is a failure diagnosis instruction. If the determination is negative, the procedure proceeds to step S205. That is, the slave controller 21 executes a procedure as needed in accordance with the instruction, for example, controlling of the load device 22. In the subsequent step S206, the slave controller 21 adds required return data to the instructing signal and transmits the instructing signal to the network through the corresponding E/O converter 23. The procedure is then suspended.

If the determination of step S204 is positive, the procedure proceeds to step S207. In step S207, the slave controller 21 adds the diagnosis result data, or the ON signal indicating the bit code "1", to the instructing signal (see FIG. 3(b)). The diagnosis result data indicates to the master node 1 that the slave node 2 is capable of recognizing the diagnosis instructing signal, or the slave node 2 functions normally.

In step S208, the slave controller 21 transmits the instructing signal including the added diagnosis result data, which is the return signal for the master node 1, to the network through the corresponding E/O converter 23. The procedure is then suspended.

Figure 5:
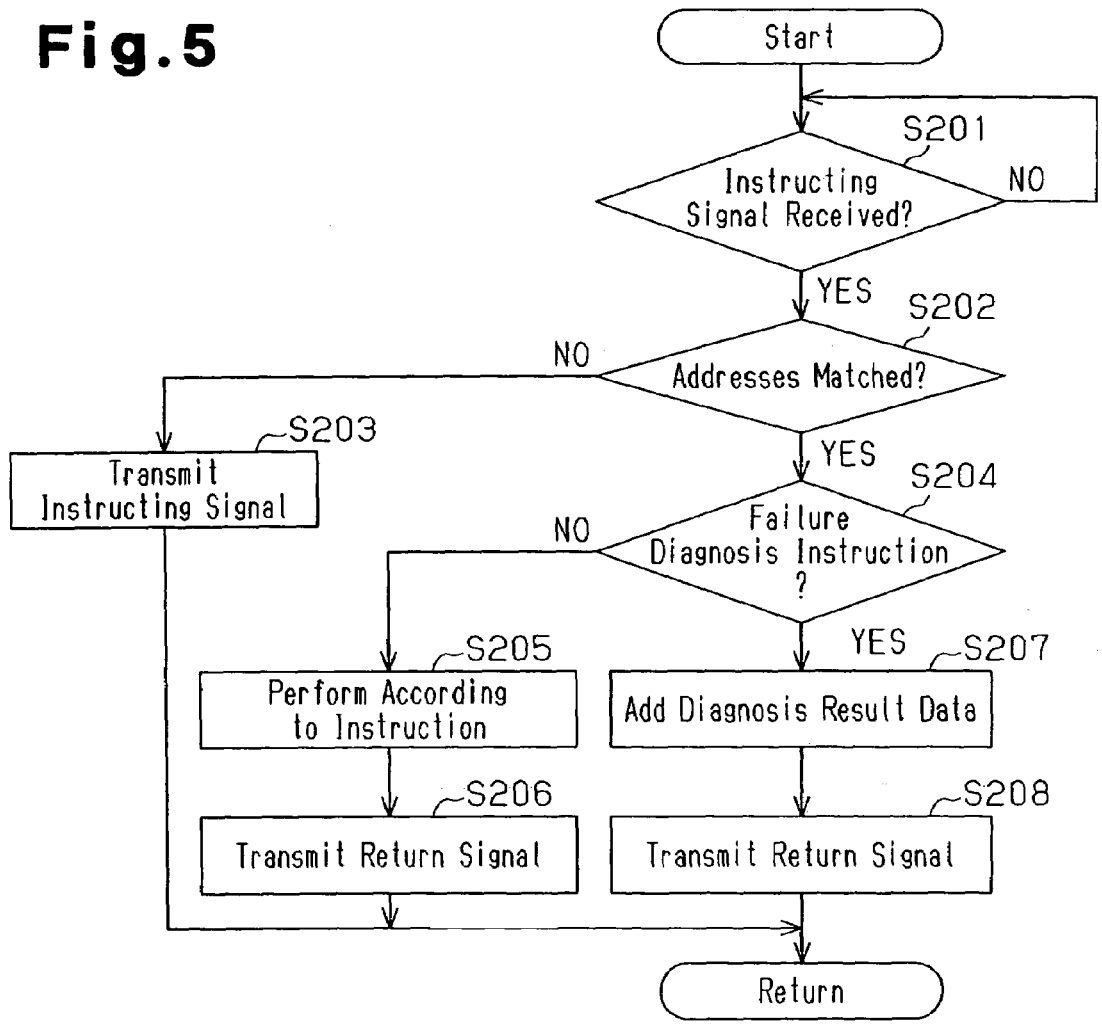
FIG. 5 is a flowchart explaining the operation of the slave nodes.

If the slave node 2 (specifically, the slave controller 21) is failed, the slave node 2 is incapable of executing the procedure indicated by the flowchart of FIG. 5. In other words, the failed slave node 2 is capable of neither recognizing the instructing signal from the master node 1 nor adding the diagnosis result data to the instructing signal. Further, the corresponding optical cutoff circuit 60 assuredly prevents the failed slave node 2 from transmitting an optical signal. Accordingly, as above described, by receiving the return signal corresponding to the instructing signal, the master node 1 is capable of determining whether or not the slave node 2 is failed.

The illustrated embodiment has the following effects.

(1) If any one of the slave nodes 2 fails and the corresponding E/O converter 23 is maintained in the turned on state, the optical cutoff circuit 60 forcibly switches the E/O converter 23 to the turned off state. This reliably prevents the failed slave node 2 from transmitting an optical signal. Thus, the subsequent slave nodes 2 and the master node 1 are allowed to read required information from the optical signal transmitted by the optical transmission line, without being affected by the failed slave node 2. Accordingly, the communication between the master node 1 and each of the remaining slave nodes 2 other than the failed one is maintained optimally. This reliably prevents a network crash caused by a failure occurring in the slave nodes 2.

(2) Each of the optical cutoff circuit 60 is not controlled by the corresponding slave controller 21. Instead, the optical cutoff circuit 60 is a hardware circuit operated autonomously in accordance with the state of the drive signal S1, which is inputted to the first transistor T1. Thus, the optical cutoff circuit 60 functions optimally unless a failure occurs in the optical cutoff circuit 60.

(3) Each optical cutoff circuit 60 is integrated in the corresponding E/O converter 23. This structure is advantageous in minimizing the device and simplifying the device configuration.

(4) The master node 1 transmits the diagnosis instructing signals corresponding to each of the slave nodes 2 to the network. When a normally functioning slave node 2 receives the corresponding diagnosis instructing signal, the slave node 2 adds the diagnosis result data (the diagnosis result information) to the diagnosis instructing signal. The slave node 2 then transmits the resulting diagnosis instructing signal to the network as the return signal for the master node 1. When the master node 1 receives the return signal from the network, the master node 1 determines whether or not the corresponding slave node 2 is failed, depending on whether or not the return signal includes the diagnosis result data. In this manner, the master node 1 reliably acknowledges a failure, if any, occurring in any one of the slave nodes 2. Further, the aforementioned function of each optical cutoff circuit 60 prevents a network crash caused by a failure occurring in any one of the slave nodes 2. Thus, such failure does not hamper the failure diagnosis procedure.

The illustrated embodiment may be modified as follows.

In the illustrated embodiment, the diagnosis instructing data is configured by the OFF signal lasting for the predetermined period. However, like the address data, the diagnosis instructing data may be configured by a binary code signal having at least one bit. Further, the diagnosis result data may be configured by a binary code signal having a plurality of bits.

Since the diagnosis instructing data of the illustrated embodiment is configured by the OFF signal lasting for the predetermined period, the diagnosis result data may be added to the zone corresponding to the diagnosis instructing data. This configuration shortens the data length of the optical signal.

The configuration of each of the optical cutoff circuits 60 is not restricted to that of FIG. 2 but may be modified as needed. For example, each of the first and second transistors T1, T2 is not limited to the NPN transistor but may be formed by various semiconductor elements that perform switching operation, such as a PNP transistor and an FET.

The optical LAN device of the present invention may be applied to apparatuses other than the vehicle.

The present invention is not restricted to the ring type optical LAN device but may be applied to different types of optical LAN devices such as a bus type LAN device.

The invention claimed is:

1. An optical LAN device including a master node and a plurality of slave nodes interconnected by an optical fiber cable for configuring a network, the network including a plurality of optical bypass transmission lines each corresponding to an associated one of the slave nodes, each of the optical bypass transmission lines bypassing the corresponding slave node, wherein each of the slave nodes includes:

a light sending portion controlled to flash for generating an optical signal transmitted to the network; and an optical cutoff circuit for forcibly switching the light sending portion to a turned off state when the slave node fails such that the corresponding light sending portion is maintained in a turned on state, wherein each of the light sending portions includes a light emitting element and a switching element for driving the light emitting element, the light emitting element being turned on when the switching element is turned on and turned off when the switching element is turned off, the optical cutoff circuit forcibly switching the switching element from a turned on state to a turned off state when the corresponding slave node fails such that the switching element is maintained in the turned on state, and wherein each of the slave nodes includes a controller outputting a drive signal to the corresponding switching element for controlling the switching element, and, when the controller fails and continuously outputs the drive signal for maintaining the switching element in the turned on state, the corresponding optical cutoff circuit invalidates the drive signal outputted by the controller.

2. The device according to claim 1, wherein:

the master node transmits a diagnosis instructing signal corresponding to an associated one of the slave nodes to the network;

when each of the slave nodes receives the corresponding diagnosis instructing signal form the network, the slave node adds diagnosis result information to the diagnosis instructing signal and transmits the resulting signal to the network as a return signal for the master node; and based on the diagnosis result information included in the return signal from the network, the master node determines whether or not the slave node corresponding to the return signal is failed.

3. The device according to claim 2, wherein, depending on whether or not the diagnosis result information is included in the return signal from the network, the master node determines whether or not the slave node corresponding to the return signal is failed.

4. The device according to claim 2, wherein the master node includes an annunciator for announcing a failure of any one of the slave nodes.

5. An optical LAN device including a master node and a plurality of slave nodes interconnected by an optical fiber cable for configuring a network, the network including a plurality of optical bypass transmission lines each corresponding to an associated one of the slave nodes, each of the optical bypass transmission lines bypassing the corresponding slave node, wherein each of the slave nodes includes:

a light sending portion controlled to flash for generating an optical signal transmitted to the network; and an optical cutoff circuit for forcibly switching the light sending portion to a turned off state when the slave node fails such that the corresponding light sending portion is maintained in a turned on state, wherein each of the light sending portions includes a light emitting element and a switching element for driving the light emitting element, the light emitting element being turned on when the switching element is turned on and turned off when the switching element is turned off, the optical cutoff circuit forcibly switching the switching element from a turned on state to a turned off state when the corresponding slave node fails such that the switching element is maintained in the turned on state, wherein each of the switching elements is a first switching element having an input terminal, each of the slave nodes including a controller for supplying a voltage signal corresponding to the optical signal to the input terminal of the first switching element, the first switching element outputting a voltage signal corresponding to the level of the voltage signal when the first switching element is turned on by the inputted voltage signal, and wherein each of the optical cutoff circuits includes a smoothing circuit, a comparing circuit, and a second switching element, each smoothing circuit smoothing the level of the voltage signal outputted by the first switching element, the comparing circuit comparing the level of the voltage signal outputted by the smoothing circuit with a predetermined reference level, the comparing circuit outputting an ON signal when the level of the voltage signal is larger than the reference level, the second switching element being turned on by the ON signal outputted by the comparing circuit and grounding the input terminal of the corresponding first switching element.

6. The device according to claim 5, wherein:

the master node transmits a diagnosis instructing signal corresponding to an associated one of the slave nodes to the network;

when each of the slave nodes receives the corresponding diagnosis instructing signal from the network, the slave node adds diagnosis result information to the diagnosis instructing signal and transmits the resulting signal to the network as a return signal for the master node; and based on the diagnosis result information included in the return signal from the network, the master node determines whether or not the slave node corresponding to the return signal is failed.

7. The device according to claim 6, wherein, depending on whether or not the diagnosis result information is included in the return signal from the network, the master node determines whether or not the slave node corresponding to the return signal is failed.

8. The device according to claim 6, wherein the master node includes an annunciator for announcing a failure of any one of the slave nodes.

* * * * *